(12) United States Patent
Ozawa et al.

(10) Patent No.: US 7,491,345 B2
(45) Date of Patent: Feb. 17, 2009

(54) EXTRACTION MIXTURE FOR RECOVERY OF ACTINIDE ELEMENTS FROM ACIDIC SOLUTIONS

(75) Inventors: Masaki Ozawa, Higashi-Ibaraki-gun (JP); Vasily Alexandrovich Babain, St-Petersburg (RU); Yury Stepanovich Fedorov, St-Petersburg (RU); Andey Yurievich Shadrin, St-Petersburg (RU); Valery Nikolaevich Romanovsky, St-Petersburg (RU); Igor Valentinovich Smirnov, St-Petersburg (RU); Boris Yakovlevich Zilberman, St-Petersburg (RU)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 725 days.

(21) Appl. No.: 11/097,257

(22) Filed: Apr. 4, 2005

(65) Prior Publication Data

US 2006/0033085 A1    Feb. 16, 2006

(30) Foreign Application Priority Data

Aug. 13, 2004    (RU) .............................. 2004124918

(51) Int. Cl.
*B01D 11/00* (2006.01)
(52) U.S. Cl. .......................... 252/184; 252/364; 423/9; 423/10; 423/DIG. 14
(58) Field of Classification Search ................. 252/184, 252/364; 423/9, 10, DIG. 14
See application file for complete search history.

(56) References Cited

U.S. PATENT DOCUMENTS 6,258,333 B1 * 7/2001 Romanovskiy et al. ....... 423/10
6,468,445 B2 * 10/2002 Romanovskiy et al. ..... 252/364

FOREIGN PATENT DOCUMENTS

JP    01143837    *    6/1989
RU    1603552     *    7/1994

OTHER PUBLICATIONS

S.M. Stoller et al., Reactor Handbook, Second Edition, vol. II, Fuel Reprocessing, 1961. pp. 101-102.

B.F. Myasoedov et al., "Method for extraction recovery of rare-earth and actinide elements," Russian Certificate of Authorship No. 1524519, Aug. 23, 1992 (converted to Patent on Apr. 27, 1997).

E.P. Horwitz et al. "The Truex Process—A Process for the Extraction of the Transuranic Elements From Nitric Acid Wastes Utilizing Modified Purex Solvent," Solvent Extraction and Ion Exchange, vol. 3 (1&2), 1985. pp. 75-109.

* cited by examiner

*Primary Examiner*—Steven Bos
(74) *Attorney, Agent, or Firm*—Wenderoth, Lind & Ponack, L.L.P.

(57) ABSTRACT

Extraction mixture capable of recovering actinide elements such as U, Pu and transplutonium elements from radioactive liquid waste in reprocessing of spent nuclear fuel. One embodiment of the extraction mixture includes a solution of bidentate organophosphorus extractant, dihexyl-N, N-diethylcarbamoyl phosphonate in a polar diluent, wherein bis-tetrafluoropropyl ether of diethylene glycol is used as the polar diluent at the following ratio of components: 0.1-1.2 M/L of bidentate extractant and the rest of diluent. Another embodiment of the extraction mixture includes a solution of bidentate organophosphorus extractant, phenyloctyl-N,N-diisobutylcarbamoylphosphine oxide in a polar diluent, wherein a mixture of metanitrobenzotrifluoride with trialkylphosphate is used as the polar diluent at the following ratio of components: 0.1-1.2 M/L of bidentate extractant, 0.3-1.1 M/L of TBP, and the rest of MNBTF.

2 Claims, 2 Drawing Sheets

EXTRACTION MIXTURE FOR RECOVERY OF ACTINIDE ELEMENTS FROM ACIDIC SOLUTIONS

FIELD OF THE INVENTION

This invention relates to radiochemical technology, particularly to reprocessing of radioactive waste arising from management of spent nuclear fuel (SNF) and/or can be used for extraction recovery of nonferrous metals.

BACKGROUND OF THE INVENTION

Ecological safety requires that the long-lived radionuclides generated in spent nuclear fuel reprocessing be converted into the forms preventing their penetration into the environment during storage. Therefore it is necessary therewith to provide the recovery of uranium, plutonium and transplutonium elements (TPE), especially americium and curium.

Liquid extraction is the most widespread method for reprocessing of liquid high-level waste (HLW). Standard PUREX-process for TBP (tributylphosphate) extraction of uranium and plutonium from acidic solutions is known [Reactor Handbook, Sec. Edition, Ed. S. M. Stoller, R. B. Richards, v.2, Fuel reprocessing, p. 101 (1961) Interscience publ. Inc., NY]. In PUREX-process the extraction mixture of 1.1 M TBP in saturated hydrocarbons is used: it extracts uranium and plutonium well, but recovers all other elements very weakly.

It is also known TRUEX-process involving the recovery of americium and curium from acidic solutions, as well as rare-earth elements (REE) [E. P. Horwitz, et al, Solv. Extr. Ion Exch., v.3(1&2), p. 75, 1985]. In TRUEX-process the extraction mixture of 0.15-0.25M phenylotcyl-N,N-diisobutylcarbamoylphosphine oxide and 0.1-1.5M TBP in saturated hydrocarbons is used to recover trivalent elements and small quantities of uranium and plutonium from acidic solutions.

The extraction mixture used in the method for extraction of REE, TPE, U and Pu by diphenylcarbamoylphosphine oxide in fluorinated diluents is most similar to the extraction mixture applied in the patent draft [B. F. Myasoedov, M. K. Chmutova, V. A. Babain, A. Yu. Shadrin, V. P. Popik, G. A. Pribulova, E. G. Dzekun. Russian Certificate of Authorship No. 1524519 (converted to patent on Apr. 27, 1997), "Method for extraction recovery of rare-earth and actinide elements"]. This method is based on extraction mixture of 0.05-0.3M diphenyl-N,N-dibutylcarbamoylphosphine oxide solution in metanitrobenzotrifluoride or ortho-nitrophenyltetrafluoroethyl ether as prototype.

Drawback of the prototype is concerned with the fact that, in the presence of appreciable uranium quantities (U concentration more that 5 g/L(liter)) in aqueous phase, the precipitation solvate of uranium with carbamoylphosphine oxide is formed in organic phase; in this case the extraction process cannot be conducted under dynamic conditions.

SUMMARY OF THE INVENTION

The objective of the present invention is to develop the extraction mixture which can simultaneously extract not only TPE and REE but also uranium and plutonium. The stated problem is solved by using the extraction mixture containing bidentate organophosphorus extractant (dihexyl-N,N-diethylcarbamoyl phosphonate $(HexO)_2/Et_2$) in bis-tetrafluoropropyl ether of diethylene glycol (fluoropole-1083).

The same result, i.e. the feasibility of extracting both uranium at high concentrations without any precipitation or the third phase and plutonium, REE and TPE, may be attained with the use of the extraction mixture containing phenyloctyl-N,N-diisobutylcarbamoylphosphine oxide (PhOct-$i$Bu$_2$) and 0.3-1.1 M/L TBP in metanitrobenzotrifluoride as diluent.

Specifically, according to one embodiment of the invention, there is provided an extraction mixture for recovery of actinide elements from acidic solutions including a solution of bidentate organophosphorus extractant, dihexyl-N,N-diethylcarbamoyl phosphonate in a polar diluent, wherein bis-tetrafluoropropyl ether of diethylene glycol is used as the polar diluent at the following ratio of components:

| | |
|---|---|
| bidentate extractant | 0.1-1.2 M/L |
| diluent | the rest. |

According to another embodiment of the invention, there is provided an extraction mixture for recovery of actinide elements from acidic solutions including a solution of bidentate organophosphorus extractant, phenyloctyl-N,N-diisobutylcarbamoylphosphine oxide in a polar diluent, wherein a mixture of metanitrobenzotrifluoride (MNBTF) with TBP is used as the polar diluent at the following ratio of components:

| | |
|---|---|
| bidentate extractant | 0.1-1.2 M/l |
| TBP | 0.3-1.1 M/l |
| MNBTF | the rest. |

When comparing the proposed extraction mixture with the prototype, it may be noted that the proposed extraction mixture, as well as the prototype, affords the extraction of uranium, REE and TRU from aqueous acidic solutions of different composition.

PREFERRED EMBODIMENTS OF THE INVENTION

The following Examples are given to illustrate the method of the invention.

EXAMPLE 1

Figure 1:
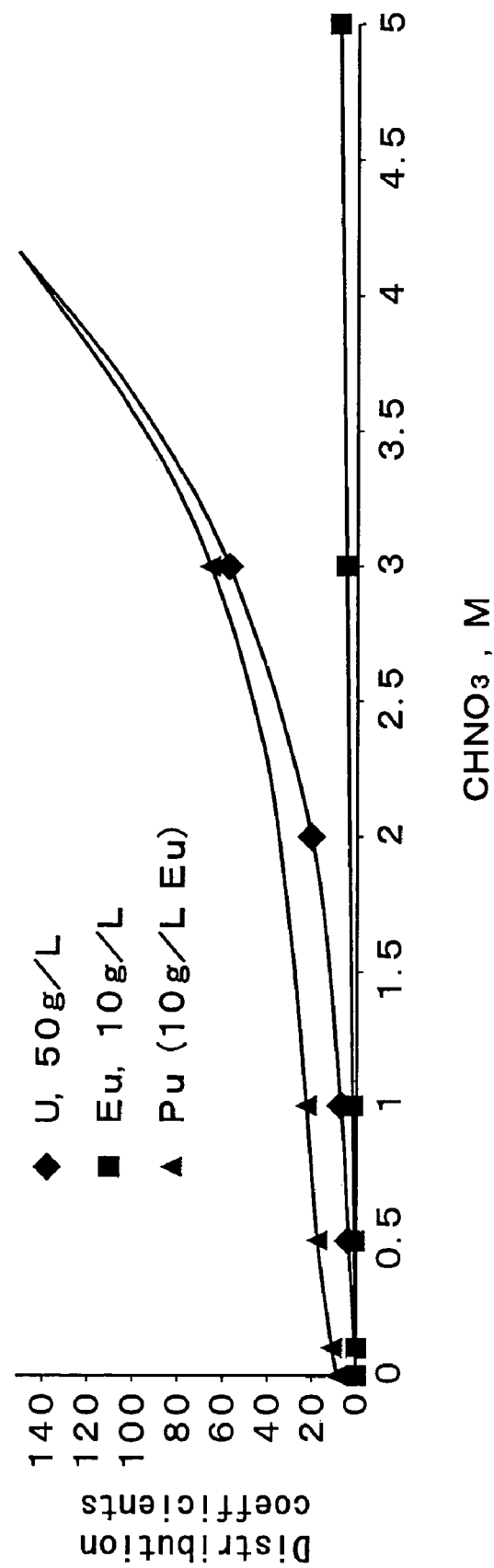
FIG. 1 is a graph showing extraction of U, Pu and Eu by 30% $(HexO)_2/Et_2$ in polar diluent fluoropole-1083.

Extraction mixture of 30% $(HexO)_2/Et_2$ in polar diluent fluoropole-1083 was contacted with $HNO_3$ solution containing the nitrates of metals (U, TRU, Eu) at 20° C. for 3 min. Distribution coefficients are given in FIG. 1 and Table 1.

TABLE 1

Extraction of U, TRU and Eu by extraction mixture of 30% $(HexO)_2/Et_2$ in polar diluent fluoropole-1083 from 2 M $HNO_3$ in the presence of uranylnitrate (initial concentration of uranium in aqueous phase - 100 g/L)

| | Element | | | | |
|---|---|---|---|---|---|
| | U | Pu | Np | Am | Eu |
| Dist. Coeff. | 17 | 45 | 7 | 2.1 | 1.4 |

EXAMPLE 2

Figure 2:
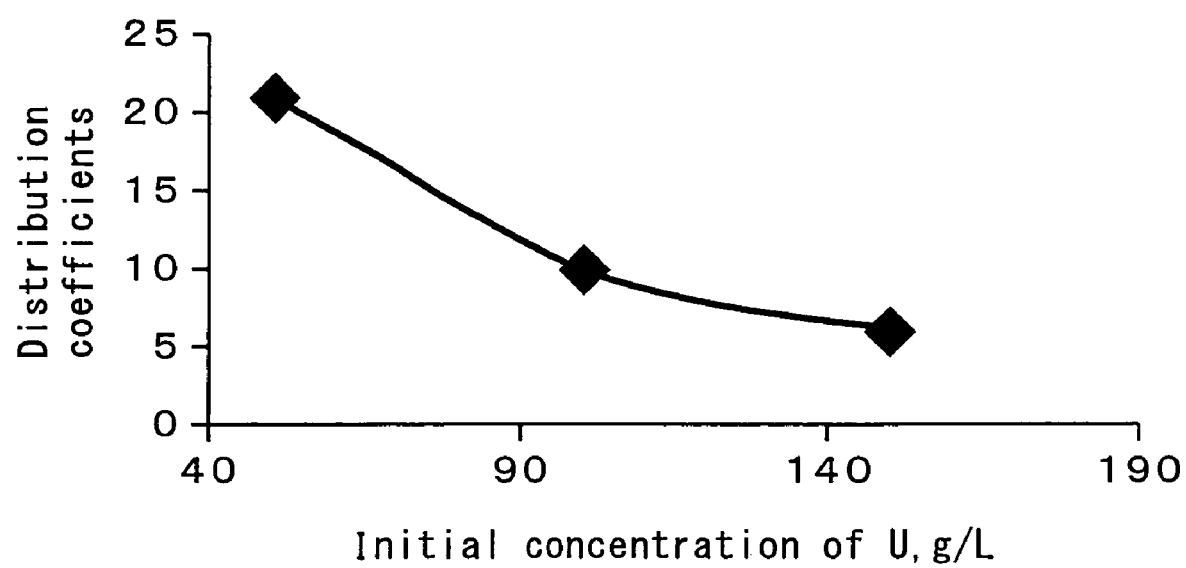
FIG. 2 is a graph showing U extraction by 30% $(HexO)_2/Et_2$ in polar diluent fluoropole-1083, depending on initial U concentration.

Extraction mixture of 30% (HexO)$_2$/Et$_2$ in polar diluent fluoropole-1083 was contacted with HNO$_3$ solution containing the various concentrations of uranylnitrate at 20° C. for 3 min. Distribution coefficients are presented on FIG. 2.

EXAMPLE 3 (prototype)

Extraction mixture of 0.2M phenyloctyl-N,N-diisobutyl-carbamoylphosphine oxide and 1.1M TBP in dodecane was contacted with HNO$_3$ concentrations of uranylnitrate at 20° C. for 3 min. At concentration of uranium above 10 g/L, the third phase is formed during extraction, and at uranium concentration more than 30 g/L, precipitates are observed (Table 2).

EXAMPLE 4 (prototype)

Extraction mixture of 0.1M diphenyl-N,N-dibutylcarbamoylphosphine oxide in polar diluent metanitrobenzotrifluoride (MNBTF) was contacted with HNO$_3$ solution containing the various concentrations of uranylnitrate at 20° C. for 3 min. At uranium concentration in initial aqueous solution above 5 g/L, precipitates are observed in the course of extraction process.

Comparison of the extraction mixtures of the invention with prototype is also shown in Table 2.

TABLE 2

| Initial organic solution | Metal concentration in initial aqueous phase, g/L | | Presence of third phase or precipitate |
|---|---|---|---|
| | U | Eu | |
| 0.2 M PhOct-iBu$_2$ in 30% TBP + dodecane | — | 300 | Third Phase |
| | 5 | — | No |
| | 20 | | Third Phase |
| | 50 | | Precipitate |
| | 100 | | Precipitate |
| | 276 | | Precipitate |
| | 50 | 2 | Precipitate |
| 0.2 M PhOct-iBu$_2$ in fluoropole-1083 | 50 | 2 | Precipitate |
| | 276 | | Precipitate |
| | — | 300 | No |
| 0.2 M PhOct-iBu$_2$ in 10% TBP + fluoropole-1083 | 50 | 2 | Precipitate |
| | 276 | | Precipitate |
| | — | 300 | No |
| 30% (HexO)$_2$/Et$_2$ in fluoropole-1083 | 50 | | No |
| | 100 | | No |
| | 200 | | No |
| 0.2 M PhOct-iBu$_2$ in 30% TBP + MNBTF | 50 | 2 | No |
| | 276 | | No |
| | — | 300 | No |
| | | 2 | No |

Hence, the given examples show that the extraction mixture of the invention recovers TPE and REE in the presence of uranium and plutonium from acidic solutions, including those with the high uranium content. The extraction mixtures used in prototypes and analogs do not enable to conduct such extraction because of precipitation.

What is claimed is:

1. An extraction mixture for recovery of actinide elements from acidic solutions, which comprises a solution of dihexyl-N,N-diethylcarbamoyl phosphonate in a polar diluent, wherein bis-tetrafluoropropyl ether of diethylene glycol is used as the polar diluent, and the dihexyl-N,N-diethylcarbamoyl phosphonate is contained in the solution in a concentration of 0.1-1.2 M/L.

2. An extraction mixture for recovery of actinide elements from acidic solutions, which comprises a solution of phenyloctyl-N,N-diisobutylcarbamoylphosphine oxide in a polar diluent, wherein a mixture of metanitrobenzotrifluoride with tributylphosphate is used as the polar diluent and the phenyloctyl-N,N-diisobutylcarbamoylphosphine oxide is contained in the solution in a concentration of 0.1-1.2 M/L, and the tributylphosphate is contained in the solution in a concentration of 0.3-1.1 M/L.

* * * * *